J. ELGER.
NUT LOCK.
APPLICATION FILED JAN. 3, 1916.
1,206,099.
Patented Nov. 28, 1916.
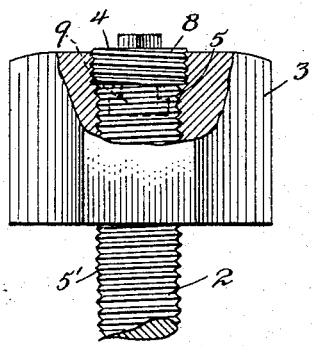
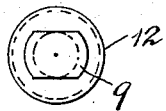
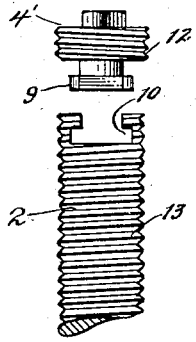
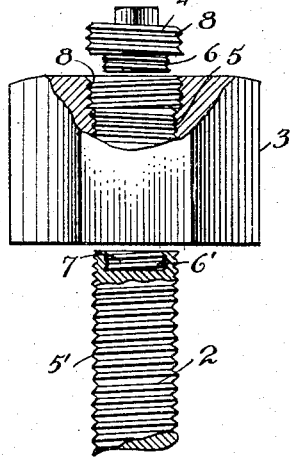
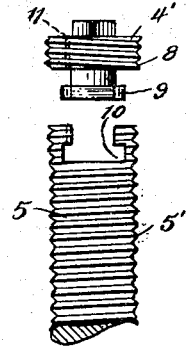
Witnesses
Rose Elger
A. Goda
Inventor:
Joseph Elger

UNITED STATES PATENT OFFICE.

JOSEPH ELGER, OF CHICAGO, ILLINOIS.

NUT-LOCK.

1,206,099.

Specification of Letters Patent.

Patented Nov. 28, 1916.

Application filed January 3, 1916. Serial No. 70,019.

*To all whom it may concern:*

Be it known that I, JOSEPH ELGER, a citizen of the United States, residing at Chicago, in the county of Cook and State of Illinois, have invented an Improved Nut-Lock, of which the following is a specification.

My invention relates to bolt threads locked within a separate, single nut.

Ordinary single nuts as used have bad features, in that they work loose on the threads and there is danger of their working off, by reason of rotary movement and other causes. If a thread protrudes through a nut the thread becomes rusted and a great deal of labor is lost in taking the nut off. In most cases of this kind it is cheaper to cut the nut off.

If a nut were molded upon a threaded bolt, said bolt having a short left hand thread at one end, within the nut, and a long right hand thread on the other part, within the nut, it would be impossible to turn the nut either way, as the left hand thread would hold the nut from backing off or screwing on, by reason of the threads being on a united bolt, within the nut. If the said threaded bolt were cut in two parts, thereby dividing the bolt, the nut would turn off, as the holding means would then be destroyed. Cutting the threaded bolts into two parts admits of the two ends being drawn together, or spread apart, by tying and uniting a left and a right hand threaded part of a bolt, within the nut. I lock the nut upon the threads as compactly as though it were molded thereon. I separate the right and left hand threads by cutting the bolts into two parts and then lock the nut upon the threads by uniting and tying the parts within the nut, as will be further described and shown, by reference to the accompanying drawings.

Figure 1 is a view showing one form of my invention in a united, tied and locked position. Fig. 2 shows the bolt of Fig. 1 separate and in divided parts. Fig. 3 shows the same form as shown in Fig. 2, only that a small opening is used on the stub end 4. Fig. 4 is an end view of the stub 4' of Fig. 2 showing the T end 9. Fig. 5 shows a threaded bolt end 2, a threaded nut 3 and a threaded stub bolt cut part 4.

The bolt 2 of the Fig. 5 has a right hand thread 5 cut on the bolt as shown. A left hand thread 6 is cut within the socket 7 as shown at the top of the bolt 2. The nut 3 has an internal long right hand thread 5, conforming to the right hand thread 5 of the bolt 2. The bolt stub 4 has a left hand thread 5, as shown. The left hand thread 6 of the bolt stub 4 conforms to the left hand thread 6 shown in the socket 7 of the bolt 2 and is cut so that it will screw into the socket 7 of the bolt 2 very tight. The bolt stub 4 also has a left hand thread 8, as shown, and the nut 3 has an internal left hand thread conforming to the left hand thread 8 of the bolt stub 4. The left hand thread 8 of the stub 4 is cut so that it will screw into the left hand thread 8, shown within the top of the nut, very tight.

Referring now to Figs. 1 and 2, I show a T end 9 in place of the left hand thread 6, shown on the stub 4 of the Fig. 5. I also show a T slot 10 in the Figs. 2 and 3, in place of the socket 7, shown in the Fig. 5. A small opening 11 is shown cut through the threaded part of the stub 4' in the Fig. 3. The small opening 11 communicates with the T slot 10 shown in the Fig. 3. The Fig. 2 shows a left hand thread 12 on the stub 4' and a right hand thread 13 on the bolt 2. If so desired a nut may be used that has a long internal left hand thread and a short internal right hand thread and cut threads like 12—13, to conform.

Like numerals refer to like parts throughout the several figures.

Referring now to Fig. 1, the parts are united and locked as follows: It is assumed that the bolt part 2 of the Fig. 1 is in position for use, and that the bolt threads protrude through the part used, according to the exact length of the nut, deducting the length for the number of threads on the stub part. It will be seen that the nut 3 must first be screwed down on the bolt and screwed up. The nut is then backed off of the threads 5' of the bolt 2, as per the number of threads on the stub 4. The stub part 4 is so constructed that when the T end 9 of the stub 4 is pushed down into the nut it enters the slot 10 and at the same time causes the left hand thread 8 on the stub 4, and the left hand thread 8 within the top of the nut 3 to communicate. The T end 9 of the stub 4 is now held in the bolt end socket 10, by reason that the T end 9 is entered therein. Assuming that the bolt 2 is now held in position the nut 3 is then screwed up, thereby drawing the T end 9 down into the T slot 10. The stub 4 is then turned so that the T end 9 is turned, crossed within the slot 10. It can further be seen that when the stub is turned the threads thereon will draw and cause the T end to wedge in the slot very tight, thus uniting and tying the nut upon the threads of the bolt as if it were molded thereon. Assuming that the bolt 2 of the Fig. 5 is placed into position for use and that the thread 5 within the nut is screwed up on the thread 5' of the bolt 2. An allowance is left within the top of the nut as per the threads 6 and 8 on the stub 4. With the nut in this position the left hand thread 6 of the stub 4 is pushed into the end of the nut. The stub 4 is so constructed that when in position the left hand thread 6' within the socket 7 of the bolt 2 communicates at the same time that the left hand thread 8 on the stub 4, and the left hand thread 8, shown within the top of the nut 3, does. The nut is then held and a wrench is used on the end of the stub part 4, which shows means for that purpose. The stub part 4 is then turned, thereby screwing the left hand thread 8 into the nut and at the same time screwing the left hand thread 6' into the left hand threaded socket 7 of the bolt 2. The stub part 4 is turned until the end of the threaded stub part 6 is butted up against the bottom of the threaded socket 7 of the bolt 2, whereby the parts are united and locked, within the nut. It will further be seen that a wrench must be used on the stub to move or remove the nut, and that the nut may be removed very readily. The means used will compel accurate measurements of bolts. There is no sense in allowing threads to protrude through a nut. It merely shows careless workmanship. The stub ends may be constructed in a manner to take up play between abutments at the face of the nut, which is also caused by careless measurements. But this would cause protruding threads of the stub end, the nut can be made longer if desired. I have also provided means as shown in the Fig. 3 to double lock the nut and seal it. A soft metal can be used and poured into the opening 11, shown; drilled through the threaded part of the stub 4. This may be done after the nut is locked upon the threads. The T slot 10 communicates with the opening 11. It can be seen that the metal poured into the opening 11 would lodge in the side of the T stub end within the slot 10 which would create a double sealed lock, and anyone not knowing the means used could not tamper with or remove the nut, as the metal must needs be melted out. A metal is used that can be easily melted out.

Having thus described my invention I do not wish to limit myself to the precise construction shown, as the parts may be slightly varied, without departing from the spirit of my invention.

I claim:

1. The combination with a right and left hand threaded separate, single nut, of a T bolt stub end, having threads the opposite of a bolt thread; said bolt thread having socket means to receive the T stub end, substantially as described and shown.

2. The combination with a right and left hand threaded separate, single nut of a T bolt stub end having threads the opposite of a bolt thread, said bolt thread having socket means to receive the bolt stub end, said T stub end having a small opening that communicates with the socket means of threaded bolt, substantially as described and shown.

In testimony whereof, I affix my signature in the presence of two witnesses this 29th day of November, 1915.

JOSEPH ELGER.

Witnesses:
 ROSE ELGER,
 A. GODA.